(12) United States Patent
Sasaki et al.

(10) Patent No.: US 10,690,843 B2
(45) Date of Patent: Jun. 23, 2020

(54) MULTICORE FIBER

(71) Applicants: FUJIKURA LTD., Tokyo (JP); NATIONAL UNIVERSITY CORPORATION HOKKAIDO UNIVERSITY, Hokkaido (JP); Technical University of Denmark, Kongens Lyngby (DK)

(72) Inventors: Yusuke Sasaki, Sakura (JP); Katsuhiro Takenaga, Sakura (JP); Kunimasa Saitoh, Sapporo (JP); Toshio Morioka, Kongens Lyngby (DK)

(73) Assignees: Fujikura Ltd., Tokyo (JP); NATIONAL UNIVERSITY CORPORATION HOKKAIDO UNIVERSITY, Hokkaido (JP); Technical University of Denmark, Kongens Lyngby (DK)

( * ) Notice: Subject to any disclaimer, the term of this patent is extended or adjusted under 35 U.S.C. 154(b) by 0 days.

(21) Appl. No.: 16/072,786

(22) PCT Filed: Mar. 2, 2017

(86) PCT No.: PCT/JP2017/008307
§ 371 (c)(1),
(2) Date: Jul. 25, 2018

(87) PCT Pub. No.: WO2017/159385
PCT Pub. Date: Sep. 21, 2017

(65) Prior Publication Data
US 2019/0033513 A1 Jan. 31, 2019

(30) Foreign Application Priority Data
Mar. 17, 2016 (JP) .................. 2016-054378

(51) Int. Cl.
*G02B 6/02* (2006.01)
*G02B 6/028* (2006.01)
*G02B 6/036* (2006.01)

(52) U.S. Cl.
CPC .......... *G02B 6/02042* (2013.01); *G02B 6/02* (2013.01); *G02B 6/0288* (2013.01); *G02B 6/02219* (2013.01); *G02B 6/036* (2013.01)

(58) Field of Classification Search
CPC .. G02B 6/02042; G02B 6/02; G02B 6/02219; G02B 6/0288; G02B 6/036
See application file for complete search history.

(56) References Cited

U.S. PATENT DOCUMENTS 3,823,996 A * 7/1974 Kompfner .......... G02B 6/02042
385/115
2013/0129292 A1 5/2013 Sasaoka et al.
(Continued)

FOREIGN PATENT DOCUMENTS

CN 102282488 A 12/2011
CN 103080797 A 5/2013
(Continued)

OTHER PUBLICATIONS

Extended European Search Report in counterpart European Application No. 17766388.7 dated Feb. 28, 2019 (8 pages).
(Continued)

*Primary Examiner* — Ryan A Lepisto
*Assistant Examiner* — Erin D Chiem
(74) *Attorney, Agent, or Firm* — Osha Liang LLP

(57) ABSTRACT

A multicore fiber includes: a first core having a first propagation loss of a first light beam in a mode one order higher than a mode of a second light beam that transmits information. The first propagation loss is 0.02 dB/m or more and 1 dB/m or less, in a wavelength band of light beams including
(Continued)

the second light beam that transmit the information when a bend having a diameter of 280 mm is applied to the multicore fiber.

20 Claims, 10 Drawing Sheets

(56) References Cited

U.S. PATENT DOCUMENTS

| | | | | |
|---|---|---|---|---|
| 2013/0294737 A1* | 11/2013 | Dianov | ............... | G02B 6/02042 385/127 |
| 2014/0178024 A1* | 6/2014 | Takenaga | ........... | G02B 6/02042 385/126 |
| 2016/0187576 A1* | 6/2016 | Sasaki | ................ | G02B 6/02042 385/126 |

FOREIGN PATENT DOCUMENTS

| | | | | |
|---|---|---|---|---|
| CN | 103814312 A | | 5/2014 | |
| CN | 104838298 A | | 8/2015 | |
| EP | 2 930 546 A1 | | 10/2015 | |
| JP | 2012-211964 A | | 11/2012 | |
| JP | 2013-106135 A | | 5/2013 | |
| JP | 2013171181 A | * | 9/2013 | |
| JP | 2014-10266 A | | 1/2014 | |
| JP | 2015-22086 A | | 2/2015 | |
| JP | 6177994 B2 | * | 7/2017 | ......... G02B 6/02042 |
| WO | 2011/024808 A1 | | 3/2011 | |
| WO | 2015/133407 A1 | | 9/2015 | |
| WO | WO-2015133407 A1 | * | 9/2015 | ......... G02B 6/02042 |

OTHER PUBLICATIONS

Office Action issued in corresponding Japanese Patent Application No. 2018-505807 dated Apr. 9, 2019 (3 pages).

* cited by examiner

MULTICORE FIBER

TECHNICAL FIELD

The present invention relates to a long-haul communication multicore fiber that is suitable for increasing the density of cores.

BACKGROUND

Optical fibers for use in optical fiber communication systems that are generally widely used have a structure in which the outer circumferential surface of one core is surrounded by a cladding. Optical signals propagate through the inside of this core, and thus information is transmitted.

Nowadays, with the wide spread use of optical fiber communication systems, information volumes to be transmitted are dramatically increased. In order to implement an increase in the transmission capacity of such optical fiber communication systems, a multicore fiber is known in which the outer circumferential surfaces of a plurality of cores are surrounded by a cladding. In accordance with the multicore fiber, signals can be transmitted using light beams propagating through the plurality of cores. Thus, the information volume that is transmittable through one optical fiber can be increased. Such a multicore fiber is disclosed in Patent Literature 1 below, for example.

As also described in Patent Literature 1 below, in the multicore fiber, a part of a light beam is sometimes overlapped with a part of another light beam, which propagate through cores adjacent to each other, sometimes resulting in inter-core crosstalk. An example of a method of reducing inter-core crosstalk that is considered is to increase the pitch between the cores adjacent to each other. The inter-core crosstalk is determined by the integration of the overlap of the light beams propagating through the cores adjacent to each other. Thus, the core pitch is increased to decrease the overlap, and this reduces inter-core crosstalk. The inter-core crosstalk can also be reduced by surrounding the core with a low refractive index layer having its refractive index lower than the refractive index of the core or the cladding, the low refractive index layer being formed of glass or a void. The core is surrounded by the low refractive index layer to decrease a spread of the light beams propagating through the cores in the radial direction. Thus, the overlap of the light beams propagating through the cores adjacent to each other is decreased, and this reduces inter-core crosstalk.
[Patent Literature 1] JP 2012-211964 A However, when the core pitch is increased in the multicore fiber, the number of cores provided in one multicore fiber has to be decreased in the case in which the fiber diameter is constant, and the information volume that is transmittable is decreased. In the case in which the core is surrounded by a low refractive index layer (a trench), it is known that a decrease in the core pitch increases the cutoff wavelength of the inner core surrounded by a plurality of cores with a trench (the cores surrounded by a trench). When the cutoff wavelength is excessively increased, a needless higher-mode light beam is prone to propagate. When the needless higher-mode light beam propagates, the higher-mode light beam possibly causes crosstalk or multi-path interference (MPI). Therefore, an increase in the cutoff wavelength is reduced to a predetermined range. From the viewpoint of reducing an increase in the cutoff wavelength, the core pitch is increased. However, when the core pitch is increased, the information volume that is transmittable through one multicore fiber is decreased as described above.

As described above, in the previously existing multicore fiber, the information volume that is transmittable is sometimes decreased in order to reduce an increase in the cutoff wavelength and reduce inter-core crosstalk.

Optical fibers now commercially available as products have prescribed cutoff wavelengths according to the two-meter fiber cutoff wavelength and the 22-meter cable cutoff wavelength. That is, similarly to optical fibers now commercially available as products, the previously existing multicore fiber is designed to have core pitches and any other parameters in such a manner that cutoff wavelengths at which a light beam propagates two meters or 22 meters have predetermined values.

However, in the case of performing long-haul communications, such as metro networks and basic trunk networks, optical fibers in a length of at least about one kilometer are used. In the case of performing long-haul communications, optical fibers are laid in lengths ranging from one kilometer to a few thousand kilometers. However, it is difficult to implement this laying using one optical fiber. Thus, a plurality of optical fibers is connected in intervals of at least about one kilometer. Here, the present inventors found that in order to provide a multicore fiber suitable for long-haul communications, a suitable multicore fiber can be provided only under the condition in which the cutoff wavelength at a point in time when a light beam propagates one kilometer has a predetermined value. Therefore, one or more embodiments of the present invention provide a multicore fiber suitable for long-haul communications.

SUMMARY

A multicore fiber of one or more embodiments of the present invention includes at least one core having a propagation loss of a light beam in a mode one order higher than a mode of a light beam used for transmitting information, the propagation loss being 0.02 dB/m or more and 1 dB/m or less, in a wavelength band of light beams used for transmitting the information, when a bend having a diameter of 280 mm is applied.

In the multicore fiber, the propagation loss of a light beam in a mode one order higher than the mode of a light beam used for transmitting information, i.e. the propagation loss of a needless higher-mode light beam is 0.02 dB/m or more. Thus, in the multicore fiber, the needless higher-mode light beam is sufficiently attenuated after the light beam propagates through the core one kilometer. As described above, in the case of performing long-haul communications, typically, a plurality of optical fibers is connected in intervals of at least about one kilometer. It is known that the higher-mode light beam that is the factor to degrade the quality of signals to be transmitted or the factor to cause crosstalk occurs due to the axial displacement at the connecting point between optical fibers or between an optical fiber and various devices, such as an input-output device and an amplifier. Therefore, the needless higher-mode light beam is sufficiently attenuated after the light beam propagates one kilometer. Thus, even though a needless higher-mode light beam occurs at the connecting point, the needless higher-mode light beam is sufficiently attenuated until the light beam reaches the subsequent connecting point. Therefore, in the entire transmission line configured of a plurality of the multicore fibers connected, the accumulation of higher-mode light beams is reduced. Therefore, the multicore fiber is suitable for a multicore fiber in a length of one kilometer or more, and suitable for long-haul communications.

In the previously existing multicore fiber, the core pitch and any other parameters are designed based on the two-meter fiber cutoff wavelength and the 22-meter cable cutoff wavelength as described above. However, in the multicore fiber, since the propagation loss of a needless higher-mode light beam is 1 dB/m or less, the propagation loss is not sometimes sufficiently attenuated at a point in time when the needless higher-mode light beam propagates two meters or 22 meters. In the multicore fiber, even though the 22-meter cable cutoff wavelength is equal to or greater than the wavelength band of light beams used for transmitting information, the cutoff wavelength after the light beam propagates one kilometer (the one-kilometer cutoff wavelength) is equal to or below the wavelength band of light beams used for transmitting information. As described above, in the multicore fiber, an increase in the cutoff wavelength is more permitted to some extent than in the previously existing multicore fiber. Thus, in the multicore fiber, a reduction in the inter-core crosstalk is possible by increasing the relative refractive index difference of the core to the cladding, for example, and hence the core pitch can be more decreased than in the previously existing multicore fiber, with inter-core crosstalk reduced. That is, in the multicore fiber, in the case in which the fiber diameter is constant, inter-core crosstalk can be reduced without decreasing the number of cores provided in one multicore fiber. Alternatively, in the case in which the amount of crosstalk is constant, the core pitch can be decreased without decreasing the number of cores provided in one multicore fiber, the outer cladding thickness can also be decreased, and the fiber diameter can also be decreased.

Furthermore, in one or more embodiments, the multicore fiber includes: an inner cladding surrounding an outer circumferential surface of the core; and a low refractive index layer having a refractive index lower than a refractive index of the inner cladding, the low refractive index layer surrounding the inner cladding.

Since the core is surrounded by the low refractive index layer, a spread of the light beam propagating through the core in the radial direction is decreased. Thus, the overlap of the light beams propagating through the cores adjacent to each other is decreased, and this reduces inter-core crosstalk. However, in the case in which the core is surrounded by the low refractive index layer, it is known that a decrease in the core pitch increases the cutoff wavelength of the core surrounded by a plurality of cores. However, in the multicore fiber, an increase in the cutoff wavelength is more permitted to some extent than in the previously existing multicore fiber as described above, and hence the core pitch can be more decreased than the core pitch of the previously existing multicore fiber.

In the multicore fiber, the light beam used for transmitting the information can be an $LP_{01}$ mode light beam.

In this case, single-mode communications are achieved. The $LP_{11}$ mode light beam in a mode one order higher than the $LP_{01}$ mode is sufficiently attenuated at a point in time when the light beam propagates through the core one kilometer.

Alternatively, in the multicore fiber, the light beam used for transmitting the information can also be an $LP_{01}$ mode light beam and an $LP_{11}$ mode light beam.

In this case, few-mode communications are achieved. The light beam in a mode one order higher than the $LP_{11}$ mode is sufficiently attenuated at a point in time when the light beam propagates through the core one kilometer.

In the multicore fiber, the total number of 32 cores formed of two types of cores having different propagation constants can be placed in a square lattice in an alternate arrangement, the bending radius can be 100 mm or more, inter-core crosstalk can be −29 dB/100 km or less, and the fiber diameter can be 250 μm or less.

Furthermore, in one or more embodiments, in the multicore fiber, a circle having a radius that is a line connecting a center of a core to a center of another core placed at a position nearest the core is a reference circle; and a propagation loss of a light beam in a mode one order higher than a mode of a light beam used for transmitting the information is 0.02 dB/m or more and 1 dB/m or less in a core placed in a center of the reference circle, where at least three cores are overlapped, in a wavelength band of light beams used for transmitting the information, when a bend having a diameter of 280 mm is applied.

It is known that the cutoff wavelength of the core surrounded by many cores is prone to be increased. Therefore, as described above, the core surrounded by at least three cores has the propagation loss of a needless higher-mode light beam that is 0.02 dB/m or more. Thus, in the entire multicore fiber, a needless higher-mode light beam is easily sufficiently attenuated at a point in time when the light beam propagates one kilometer, and an optical fiber suitable for long-haul communications can be provided.

Furthermore, in one or more embodiments, in the multicore fiber, a propagation loss of a light beam in a mode one order higher than a mode of a light beam used for transmitting the information is 0.02 dB/m or more and 1 dB/m or less in the core placed in the center of the reference circle, where six of the cores are overlapped, in a wavelength band of light beams used for transmitting the information.

The cores are thus placed, and hence a plurality of cores can be placed in high density.

Furthermore, in one or more embodiments, in the multicore fiber, a propagation loss of a light beam in a mode one order higher than a mode of a light beam used for transmitting the information is 0.02 dB/m or more and 1 dB/m or less in all cores in a wavelength band of light beams used for transmitting the information, when a bend having a diameter of 280 mm is applied.

The propagation loss of a needless higher-mode light beam is 0.02 dB/m or more in all the cores. Thus, in the entire multicore fiber, a needless higher-mode light beam is more easily attenuated at a point in time when the light beam propagates one kilometer, and an optical fiber more suitable for long-haul communications can be provided.

As described above, in accordance with one or more embodiments of the present invention, a multicore fiber suitable for long-haul communications can be provided.

DETAILED DESCRIPTION

Figure 1:
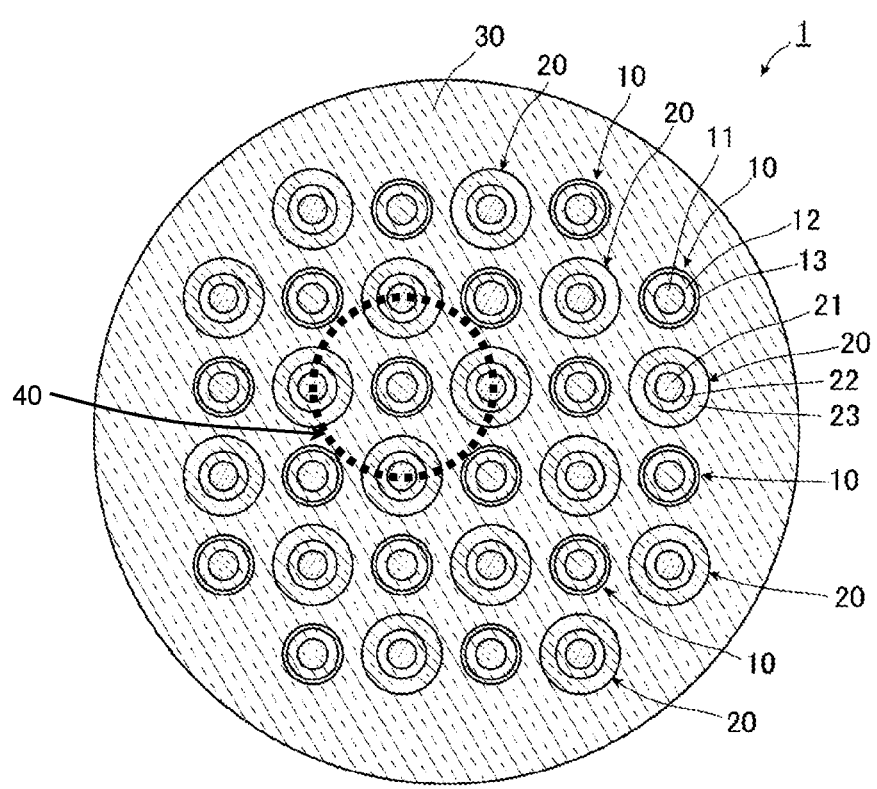
FIG. 1 is a diagram of a cross section perpendicular to the longitudinal direction of a multicore fiber according to one or more embodiments.

In the following, one or more embodiments of a multicore fiber according to the present invention will be described in detail with reference to the drawings. Note that, for easy understanding, scales described in the drawing are sometimes different from scales described in the following description.

FIG. 1 is a diagram of a cross section perpendicular to the longitudinal direction of a multicore fiber according to one or more embodiments of the present invention. As illustrated in FIG. 1, a multicore fiber 1 according to one or more embodiments includes 16 first core elements 10 and 16 second core elements 20, and includes an outer cladding 30 surrounding the outer circumferential surfaces of the first core elements 10 and the second core elements 20 with no gap. Note that, in order to prevent complicated drawings, in FIG. 1 and other drawings below, only a part of similar components is designated reference signs, and reference signs are omitted in the other similar components. Although not shown in FIG. 1, the multicore fiber 1 is coated with a resin, for example.

The first core element 10 has a first core 11, an inner cladding 12 that surrounds the outer circumferential surface of the first core 11 with no gap, and a low refractive index layer 13 that surrounds the outer circumferential surface of the inner cladding 12 with no gap, with its outer circumferential surface surrounded by an outer cladding 30 with no gap. The second core element 20 has a second core 21, an inner cladding 22 that surrounds the outer circumferential surface of the second core 21 with no gap, and a low refractive index layer 23 that surrounds the outer circumferential surface of the inner cladding 22 with no gap, with its outer circumferential surface surrounded by the outer cladding 30 with no gap. In one or more embodiments, as illustrated in FIG. 1, the diameter of the first core element 10 is smaller than the diameter of the second core element 20. Note that, in the following description, the core that is simply referred to as sometimes means both the first and the second cores 11 and 21. The core element that is simply referred to as sometimes means both the first and the second core elements 10 and 20.

The first and the second cores 11 and 21 are placed in a square lattice in an alternate arrangement. The first and the second cores 11 and 21 have different propagation constants. As described above, the first and the second cores 11 and 21 having different propagation constants are placed in an alternate arrangement. Thus, in the multicore fiber 1, phase matching hardly occurs, and this easily reduces inter-core crosstalk. The first and the second cores 11 and 21 are placed in a square lattice, and this facilitates an alternate arrangement of two types of cores and the arrangement of cores as many as possible in a predetermined range.

Figure 2A:
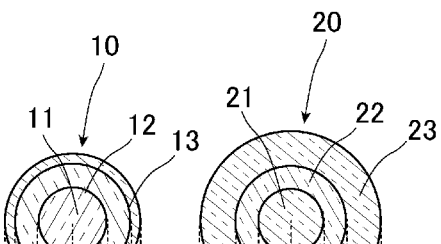
FIGS. 2A and 2B are diagrams of the refractive indexes and the sizes of core elements of the multicore fiber illustrated in FIG. 1.
Figure 2B:
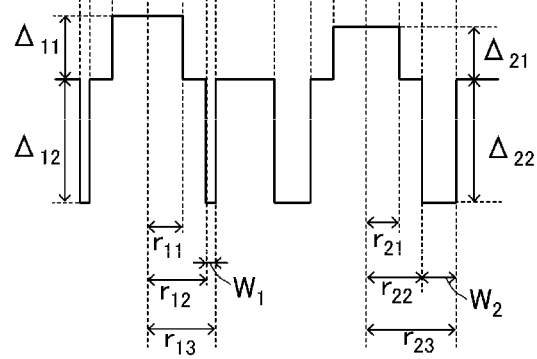

FIGS. 2A and 2B are diagrams of the refractive indexes and the sizes of the first and the second core elements 10 and 20 of the multicore fiber 1 illustrated in FIG. 1. FIG. 2A illustrates the first and the second core elements 10 and 20 that are arranged side by side. FIG. 2B illustrates refractive indexes depicted by solid lines in the case in which the space between the first and the second core elements 10 and 20 is buried with the outer cladding 30.

In one or more embodiments, the first and the second cores 11 and 21 are formed to have different refractive indexes and sizes as described above. The refractive index of the first core 11 is higher than the refractive index of the inner cladding 12. The refractive index of the low refractive index layer 13 is lower than the refractive indexes of the inner cladding 12 and the outer cladding 30. The refractive index of the second core 21 is higher than the refractive index of the inner cladding 22. The refractive index of the low refractive index layer 23 is lower than the refractive indexes of the inner cladding 22 and the outer cladding 30. Note that, in one or more embodiments, the refractive index of the inner cladding 12 is the same as the refractive index of the outer cladding 30. The refractive index of the inner cladding 22 is the same as the refractive index of the outer cladding 30.

In the following description, as illustrated in FIGS. 2A and 2B, the relative refractive index difference of the first core 11 to the outer cladding 30 is defined as $\Lambda_{11}$, the relative refractive index difference of the low refractive index layer 13 to the outer cladding 30 is defined as $\Lambda 12$, the relative refractive index difference of the second core 21 to the outer cladding 30 is defined as $\Lambda_{21}$, and the relative refractive index difference of the low refractive index layer 23 to the outer cladding 30 is defined as $\Lambda_{22}$. The radius of the first core 11 is defined as $r_{11}$, the radius of the inner circumference of the low refractive index layer 13 is defined as $r_{12}$, the radius of the outer circumference of the low refractive index layer 13 is defined as $r_{13}$, the thickness of the low refractive index layer 13 is defined as $W_1$ ($=r_{13}-r_{12}$), the radius of the second core 21 is defined as $r_{21}$, the radius of the inner circumference of the low refractive index layer 23 is defined as $r_{22}$, the radius of the outer circumference of the low refractive index layer 23 is defined as $r_{23}$, and the thickness of the low refractive index layer 23 is defined as $W_2$ ($=r_{23}-r_{22}$). Note that, in the multicore fiber 1, relational expressions below are held.

$$r_{11} > r_{21}$$

$$r_{12}/r_{11} = r_{22}/r_{21}$$

$$r_{12} > r_{22}$$

$$\Delta_{11} > \Delta_{21}$$

$$\Delta_{12} = \Delta_{22}$$

$$W_2 > W_1$$

The multicore fiber 1 includes the first and the second cores 11 and 21 in which the propagation loss of a light beam in a mode one order higher than the mode of a light beam used for transmitting information is 0.02 dB/m or more and 1 dB/m or less in the wavelength band of light beams used for transmitting information, when a bend having a diameter of 280 mm is applied. Here, the wavelength band of light beams used for transmitting information can be the C band, for example. The light beam used for transmitting information can be the $LP_{01}$ mode light beam, for example. In order to cause the light beam to propagate as described above, in one of more embodiments, examples of the parameters only have to be set as follows. $R_{11}$=4.80 µm, $r_{12}/r_{11}$=1.7, $W_1/r_{11}$=0.3, $r_{21}$=4.60 µm, $r_{22}/r_{21}$=1.7, $W_2/r_{21}$=1.1, $\Delta_{11}$=0.35%, $\Delta_{12}$=−0.7%, $\Delta_{21}$=0.30%, $\Delta_{22}$=−0.7%, the distance OCT=37.3 µm from the center of the outermost core from the center of the fiber to the coating of the multicore fiber 1, and the fiber diameter=234.37 µm.

In the multicore fiber 1, the propagation loss of a light beam in a mode one order higher than the mode of a light beam used for transmitting information, i.e. the propagation loss of a needless higher-mode light beam is 0.02 dB/m or more. Thus, in the multicore fiber 1, the needless higher-mode light beam is sufficiently attenuated after the light beam propagates through the core one kilometer. For example, supposing that the light beam used for transmitting information is the $LP_{01}$ mode light beam, the $LP_{11}$ mode light beam is sufficiently attenuated at a point in time when the light beam propagates one kilometer. In the case of performing long-haul communications, a plurality of optical fibers is typically connected in intervals of at least about one kilometer. It is known that the higher-mode light beam that is the factor to degrade the quality of signals to be transmitted or the factor to cause crosstalk occurs due to the axial displacement at the connecting point between optical fibers or between an optical fiber and various devices, such as an input-output device and an amplifier. As described above, the needless higher-mode light beam is sufficiently attenuated after the light beam propagates one kilometer. Thus, even though a needless higher-mode light beam occurs at the connecting point between the multicore fibers 1 or at the connecting point between the multicore fiber 1 and various devices, the needless higher-mode light beam is sufficiently attenuated until the light beam reaches the subsequent connecting point. Therefore, in the entire transmission line configured of a plurality of the multicore fibers 1 connected, the accumulation of higher-mode light beams is reduced. Accordingly, the multicore fiber 1 is suitable for long-haul communications.

In the previously existing multicore fiber, the core pitch and any other parameters are designed based on the two-meter fiber cutoff wavelength and the 22-meter cable cutoff wavelength as described above. However, in the multicore fiber 1, since the propagation loss of a needless higher-mode light beam is 1 dB/m or less, the propagation loss is not sometimes sufficiently attenuated at a point in time when the needless higher-mode light beam propagates two meters or 22 meters. In the multicore fiber 1, even though the 22-meter cable cutoff wavelength is equal to or greater than the wavelength band of light beams used for transmitting information, the one-kilometer cutoff wavelength is equal to or below the wavelength band of light beams used for transmitting information. As described above, in the multicore fiber 1, an increase in the cutoff wavelength is more permitted to some extent than in the previously existing multicore fiber. Thus, in the multicore fiber 1, a reduction in the inter-core crosstalk is possible by increasing the relative refractive index difference of the core to the outer cladding 30, for example, and hence the core pitch can be more decreased than the core pitch of the previously existing multicore fiber. Consequently, in the multicore fiber 1, since the number of cores provided in one multicore fiber 1 can be increased in the case in which the fiber diameter is constant, a transmittable information volume can be increased. Accordingly, the multicore fiber 1 is suitable for long-haul, large-capacity communications.

In accordance with the multicore fiber 1, the core pitch can be more decreased than the core pitch of the previously existing multicore fiber as described above. Thus, a configuration can also be provided in which the outer cladding 30 is decreased to shrink the fiber diameter (the diameter of the outer circumference of the outer cladding 30). The fiber diameter of the multicore fiber 1 is not limited specifically. However, the fiber diameter can be set to 250 µm or less. From the viewpoint of securing long-term reliability, the fiber diameter is about 230 µm in one or more embodiments.

In accordance with the multicore fiber 1, the first core 11 is surrounded by the low refractive index layer 13, and the second core 21 is surrounded by the low refractive index layer 23. Thus, a spread of the light beams propagating through the first and the second cores 11 and 21 in the radial direction is decreased. Consequently, the overlap of the light beams propagating through the cores adjacent to each other is decreased, and this reduces inter-core crosstalk. However, in the case in which the core is surrounded by the low refractive index layer, it is known that a decrease in the core pitch increases the cutoff wavelength of the core surrounded by a plurality of cores. However, in the multicore fiber 1, an increase in the cutoff wavelength is more permitted to some extent than in the previously existing multicore fiber as described above, and hence the core pitch can be more decreased than the core pitch of the previously existing multicore fiber.

As described above, the present invention is described using embodiments as examples. However, the presented embodiments are non-limiting.

For example, in one or more embodiments described above, the first and the second cores 11 and 21 have difference in the refractive index, the size, and the propagation constant. However, at least one of the refractive indexes and the sizes of the first and the second cores 11 and 21 may be the same, or their propagation constants may be the same.

The multicore fiber 1 according to the depicted one or more embodiments includes the first core 11 and the second core 21 in which the propagation loss of a light beam in a mode one order higher than the mode of a light beam used for transmitting information is 0.02 dB/m or more and 1 dB/m or less in the wavelength band of light beams used for transmitting information, when a bend having a diameter of 280 mm is applied. However, the multicore fiber 1 only has to include at least one core in which the propagation loss of a light beam in a mode one order higher than the mode of a light beam used for transmitting information is 0.02 dB/m or more and 1 dB/m or less in the wavelength band of light beams used for transmitting information, when a bend having a diameter of 280 mm is applied.

Figure 3:
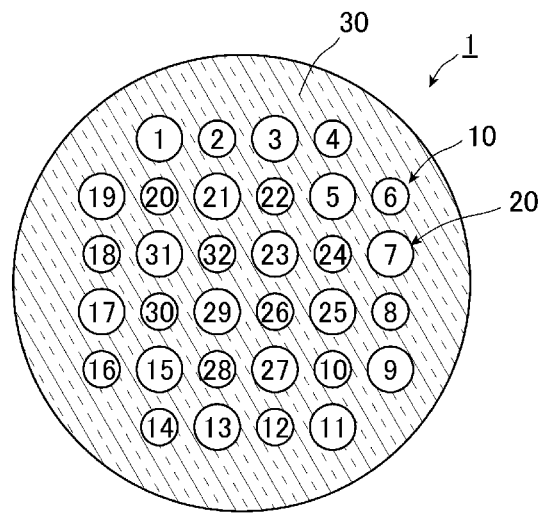
FIG. 3 is a diagram of cores included in the multicore fiber illustrated in FIG. 1, the cores being numbered for explanation.

However, under the conditions in which a circle having a radius that is a line connecting the center of a core to the center of another core placed at the position nearest the core is a reference circle 40 and a core is placed in the center of the reference circle 40 where at least three cores are overlapped when a bend having a diameter of 280 mm is applied, the core has the propagation loss of a light beam in a mode one order higher than the mode of a light beam used for transmitting information, the propagation loss being 0.02 dB/m or more and 1 dB/m or less, in the wavelength band of light beams used for transmitting information. Referring to FIG. 3, this configuration will be described in more detail below.

FIG. 3 is a diagram of the numbered core elements provided in the multicore fiber 1 illustrated in FIG. 1. For example, when core elements are numbered as illustrated in FIG. 3, on reference circles 40 having core elements No. 1, 4, 6, 9, 11, 14, 16, and 19 in the center, two core elements are overlapped. On reference circles 40 having core elements No. 2, 3, 7, 8, 12, 13, 17, and 18 in the center, three core elements are overlapped. On reference circles 40 having other core elements in the center, four core elements are overlapped. In the case in which the core element has the low refractive index layer surrounding the core, the core element placed on the inner side is surrounded by more core elements than the core element placed on the outer side as described above. It is known that the cutoff wavelength of the core surrounded by many core elements is prone to be increased. Therefore, as described above, the core surrounded by at least three cores has the propagation loss of a needless higher-mode light beam that is 0.02 dB/m or more. Thus, in the entire multicore fiber 1, a needless higher-mode light beam is easily sufficiently attenuated at a point in time when the light beam propagates one kilometer, and an optical fiber suitable for long-haul communications can be provided.

Note that, in all the cores, the propagation loss of a light beam in a mode one order higher than the mode of a light beam used for transmitting information is 0.02 dB/m or more in the wavelength band of light beams used for transmitting information. Thus, in the entire multicore fiber 1, a needless higher-mode light beam is more easily attenuated at a point in time when the light beam propagates one kilometer, and an optical fiber more suitable for long-haul communications can be provided.

In the one or more embodiments described above, the description is made using an example in which the low refractive index layers 13 and 23 are provided. However, one or either of the low refractive index layers 13 and 23 may not be provided.

In the one or more embodiments described above, the description is made using an example in which the total number of 32 cores formed of the first and the second cores 11 and 21 are placed in a square lattice. However, the total number of cores provided on the multicore fiber, the number of core types, and the arrangement of cores are non-limiting. FIGS. 4 to 7 illustrate other exemplary arrangements of cores.

Figure 4:
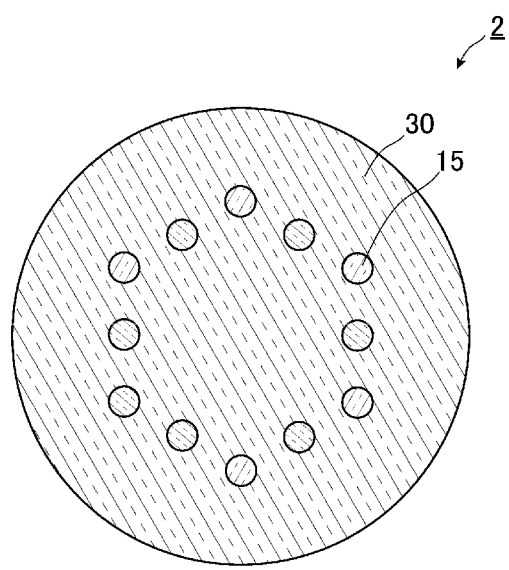
FIG. 4 is a diagram of an example in which cores are placed in a hexagon.

In a multicore fiber 2 illustrated in FIG. 4, the total number of 12 cores 15 are placed on the apexes and the sides of a hexagon. In such a structure, the number of neighboring cores and the pitch to the neighboring core can be made the same on all the cores. When the parameters of all the cores are the same, the number of neighboring cores and the core pitch are made the same on all the cores, and the propagation losses of all the cores can be made the same. Under the conditions in which the propagation losses of all the cores are the same as described above, all the cores easily have the propagation loss of a light beam in a mode one order higher than the mode of a light beam used for transmitting information, the propagation loss being 0.02 dB/m or more and 1 dB/m or less, in the wavelength band of light beams used for transmitting information, when a bend having a diameter of 280 mm is applied. In the multicore fiber having the propagation losses of all the cores that are 0.02 dB/m or more and 1 dB/m or less, it can be considered that crosstalk can be improved and the core pitch can be decreased, because containment losses are enhanced in any core, compared with a multicore fiber having the propagation losses of all the cores that are greater than 1 dB/m as the previously existing multicore fiber.

Note that, in FIG. 4, an example is shown in which 12 cores are placed in a hexagon. However, from the viewpoint of providing the same number of neighboring cores and the same pitch to the neighboring core on all the cores as described above, the number of cores and the arrangement of cores are not limited to the form illustrated in FIG. 4. The total number of cores is non-limiting. For examples of the arrangement of cores, the core may be placed on the apexes of a regular polygon, a plurality of cores may be placed on the apexes and the sides of a regular polygon at regular intervals, or a plurality of cores may be placed in a ring at regular intervals.

Figure 5:
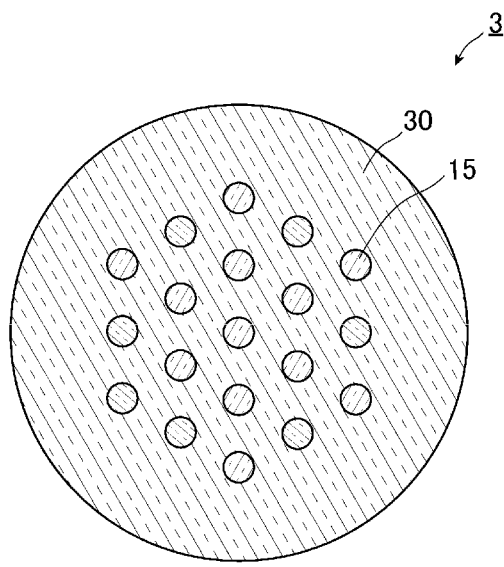
FIG. 5 is a diagram of an example in which cores are placed in a triangular lattice.
Figure 6:
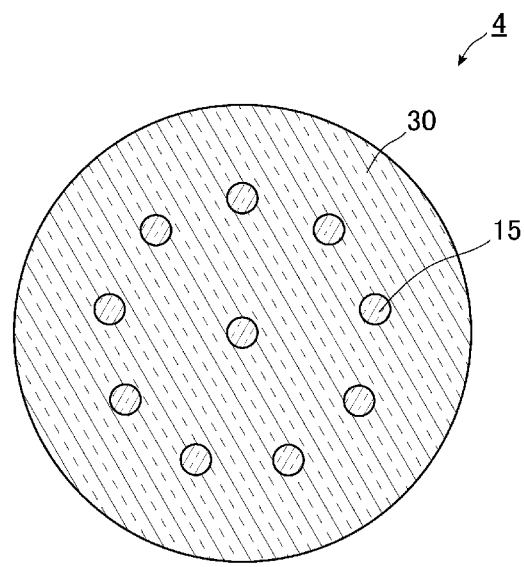
FIG. 6 is a diagram of an example in which cores are placed in a ring and a core is also placed in the center of the ring.
Figure 7:
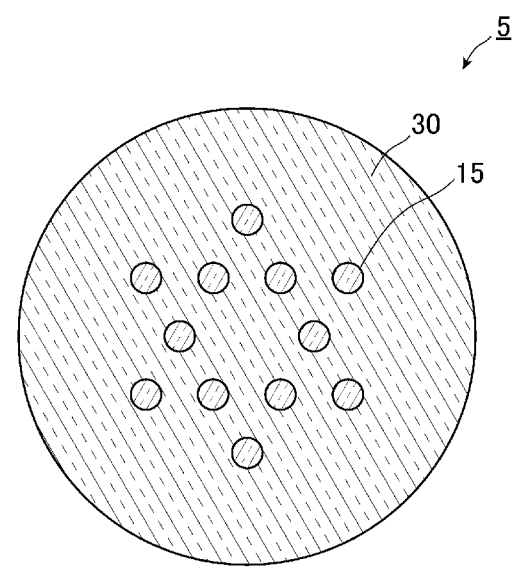
FIG. 7 is a diagram of an example in which cores are placed in a ring.

In a multicore fiber 3 illustrated in FIG. 5, the total number of 19 cores 15 are placed in a triangular lattice. In a multicore fiber 4 illustrated in FIG. 6, a plurality of cores 15 is placed in a ring, and the core 15 is placed also in the center of the ring. In a multicore fiber 5 illustrated in FIG. 7, the core 15 is placed on the apexes of a hexagon, and the core 15 is also placed on the apexes of another hexagon on the inner side of the hexagon. Another hexagon shares the center with the hexagon at a displacement at angle of 30 degrees. Note that, in these forms, forms may be provided in which all the cores 15 have the configuration similar to the first core element 10, or a part of the cores 15 has the configuration similar to the first core element 10 and the other part of the cores 15 has the configuration similar to the second core element 20.

In the one or more embodiments described above, an example is shown in which a light beam used for transmitting information is the $LP_{01}$ mode light beam. However, the $LP_{11}$ mode or higher-mode light beams are also used for transmitting information. For example, a form may be provided in which the $LP_{01}$ mode and the $LP_{11}$ mode light beams are used for transmitting information and a light beam in a mode higher than the $LP_{11}$ mode is sufficiently attenuated after one-kilometer propagation.

In the one or more embodiments described above, a so-called step index type is shown as an example in which the refractive index of the core is approximately constant in the radial direction. However, the refractive index of the core may be gradually increased from the outer side of the radial direction toward the center, the refractive index may be increased from the outer side of the radial direction toward the center step by step, or the refractive index of the center part may be lower than in the outer circumference.

EXAMPLES

In the following, one or more embodiments will be described in more detail using examples and comparative examples. However, one or more embodiments are not limited to the examples below.

Example 1

On a multicore fiber corresponding to the multicore fiber 1 illustrated in FIG. 1, simulation was performed under the conditions shown below.

The ratio between the radius $r_{11}$ of the first core 11 and the radius $r_{12}$ of the inner circumference of the low refractive index layer 13 was $r_{12}/r_{11}=1.7$, the ratio between the radius $r_{21}$ of the second core 21 and the radius $r_{22}$ of the inner circumference of the low refractive index layer 23 was $r_{22}/r_{21}=1.7$, the relative refractive index difference $\Delta_{12}$ of the low refractive index layer 13 to the outer cladding 30=−0.7%, and the relative refractive index difference of $\Delta_{22}$ of the low refractive index layer 23 to the outer cladding 30=−0.7%. In this case, supposing that the distance OCT from the center of the core placed on the outermost side to the coating of the multicore fiber 1=35 μm and the diameter of the outer circumference of the outer cladding 30=230 μm, the center pitch Λ between the cores adjacent to each other=27.4 μm.

In the multicore fiber 1 having these parameters, on the reference circle 40 having the cores No. 21 to 32 illustrated in FIG. 3 in the center, four cores are placed. It can be considered that the cutoff wavelength is more increased in the cores placed on the inner side as described above than in the other cores placed on the outer side. The parameters of the core were investigated with which when the multicore fiber 1 is bent at a bending diameter of 280 mm, the one-kilometer cutoff wavelength of the $LP_{11}$ mode light beam in the cores placed on the inner side is 1,500 nm or less (the propagation loss is 0.02 dB/m or more at a wavelength of 1,500 nm) and the distance OCT from the center of the core placed on the outermost side to the coating of the multicore fiber 1 is the minimum (the fiber diameter is the minimum). The result is shown in Table 1 below. Note that, in the case in which the wavelength of the light beam propagating through the core is 1,550 nm, the effective area $A_{eff}$ is equivalent to that of the previously existing single-mode fiber. The effective area $A_{eff}$ is 80 μm².

TABLE 1

|  |  | Condition 1 | Condition 2 | Condition 3 |
|---|---|---|---|---|
| First core | $\Delta_{11}$ [%] | 0.35 | 0.35 | 0.36 |
|  | $r_{11}$ [μm] | 4.80 | 4.80 | 4.85 |
| Second core | $\Delta_{21}$ [%] | 0.30 | 0.31 | 0.31 |
|  | $r_{21}$ [μm] | 4.60 | 4.65 | 4.65 |

Figure 8:
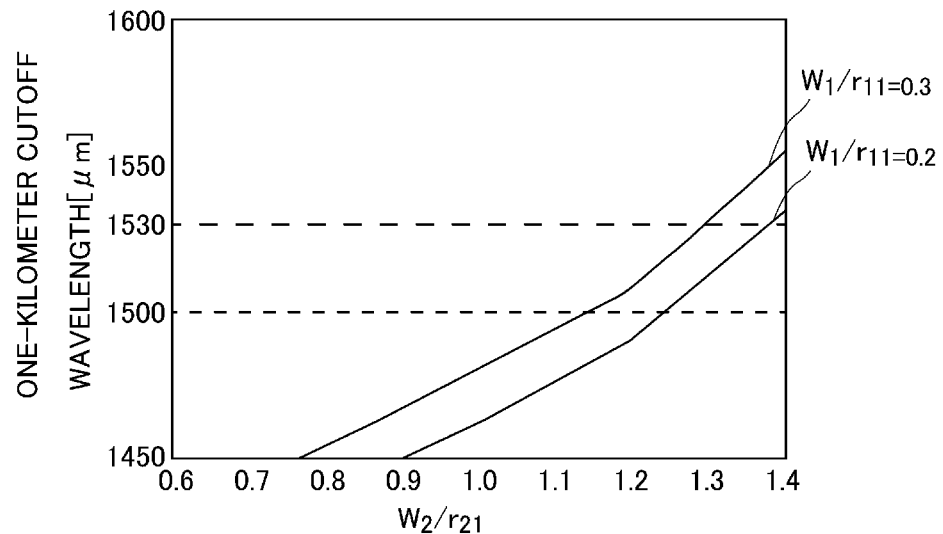
FIG. 8 is a diagram of a one-kilometer cutoff wavelength [μm] when the thickness of a low refractive index layer surrounding cores is changed under condition 1 shown in Table 1.
Figure 9:
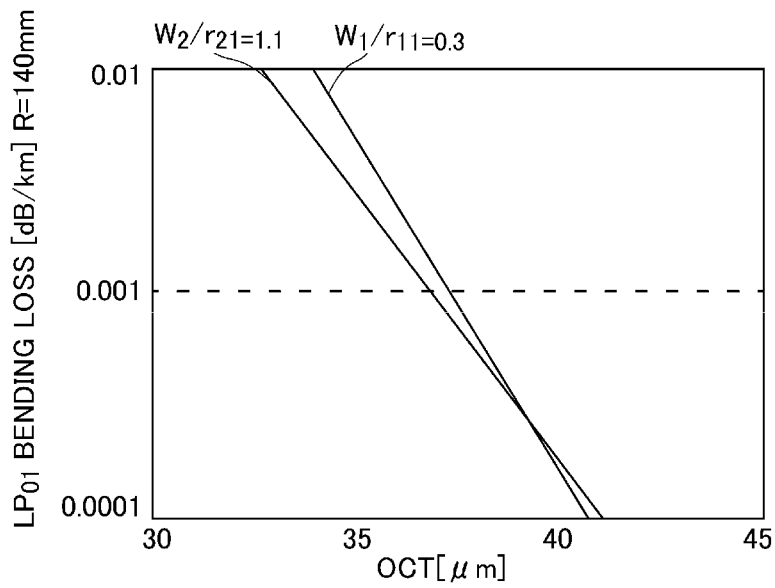
FIG. 9 is a diagram of the relationship between the bending loss [dB/km] of an $LP_{01}$ mode light beam and a distance outer cladding thickness (OCT) [μm] from the center of a core farthest from the center of a cladding to a coating in the case in which the bending diameter is set to 280 mm, where the thickness of the low refractive index layer surrounding the cores is changed, under condition 1 shown in Table 1.
Figure 10:
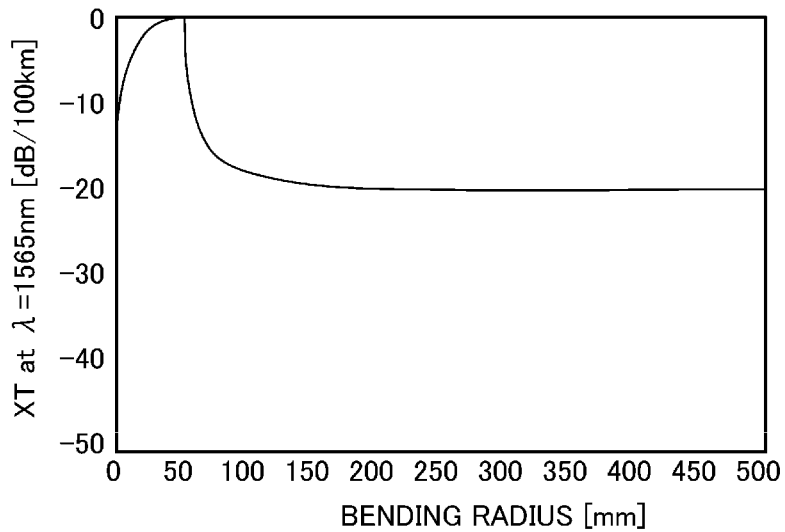
FIG. 10 is a diagram of the calculated result of the relationship between an inter-core crosstalk XT [dB/100 km] and a bending radius [mm] in the case in which the wavelength of a light beam propagating through the core is set to 1,565 nm, where the correlation length is 50 mm under condition 1 shown in Table 1.

Under condition 1 shown in Table 1, the one-kilometer cutoff wavelength [μm], where the thickness of the low refractive index layer surrounding the cores is changed, is shown in FIG. 8, the relationship between the bending loss [dB/km] of the $LP_{01}$ mode light beam and the distance OCT [μm], where the bending radius R is 140 mm (the bending diameter is 280 mm), is shown in FIG. 9, and the relationship between the inter-core crosstalk XT [dB/100 km] and the bending radius [mm] in the case in which the correlation length is 50 mm and the wavelength of the light beam propagating through the core is set to 1,565 nm is shown in FIG. 10.

Figure 11:
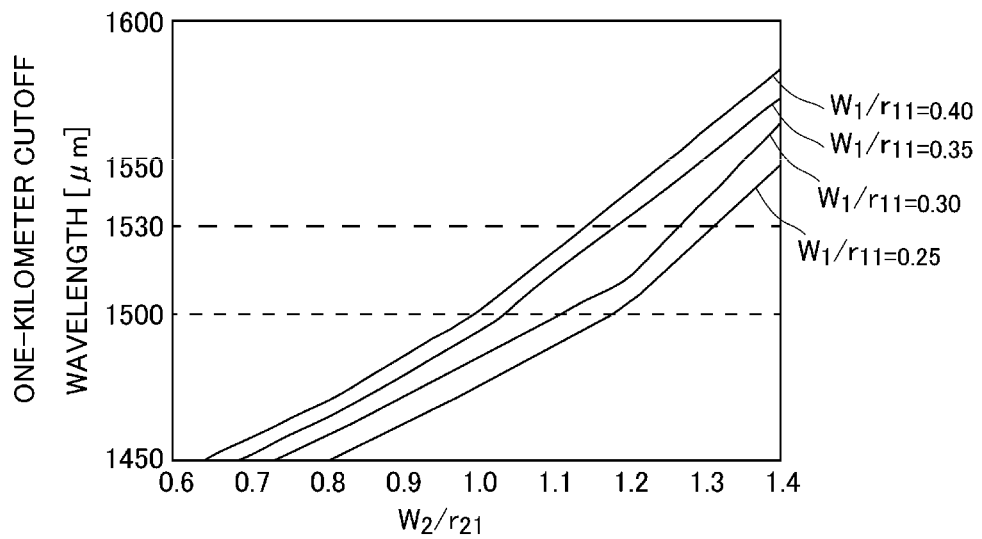
FIG. 11 is a diagram of the calculated result of the one-kilometer cutoff wavelength [μm], where the thickness of the low refractive index layer surrounding the cores is changed, under condition 2 shown in Table 1.
Figure 12:
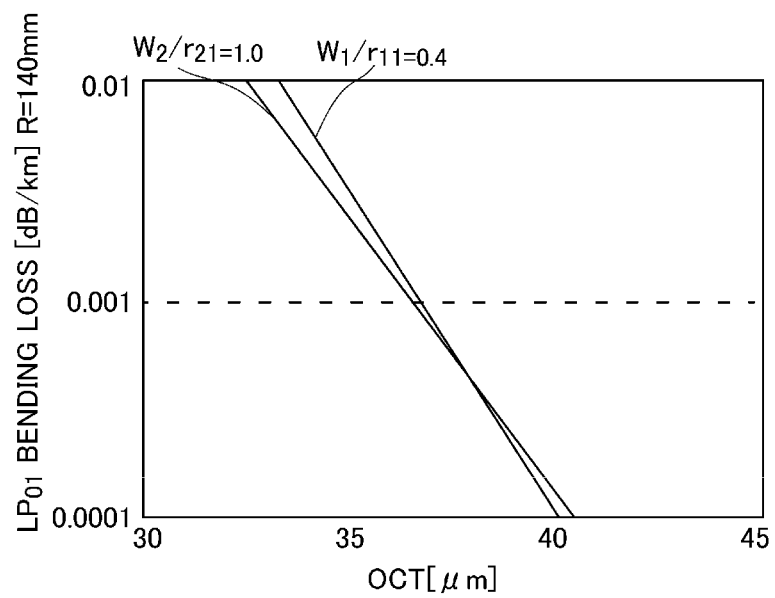
FIG. 12 is a diagram of the calculated result of the relationship between the bending loss [dB/km] of the $LP_{01}$ mode light beam and the distance OCT [μm] in the case in which the bending diameter is set to 280 mm, where the thickness of the low refractive index layer surrounding the cores is changed, under condition 2 shown in Table 1.
Figure 13:
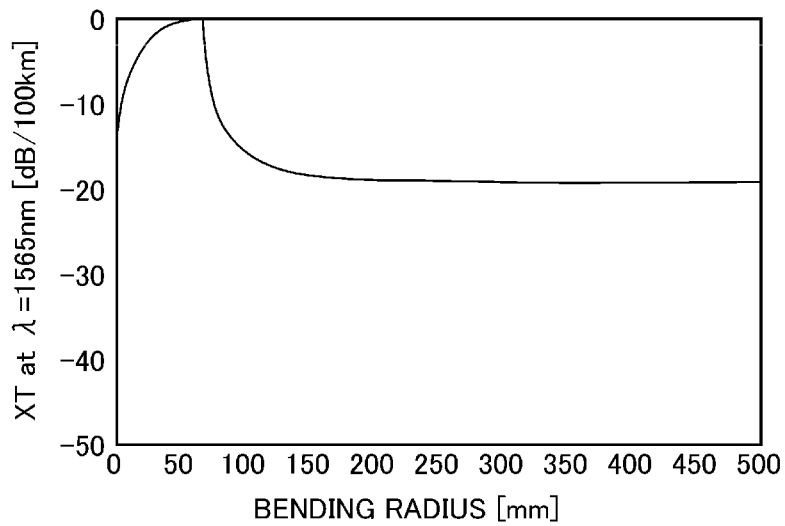
FIG. 13 is a diagram of the calculated result of the relationship between the inter-core crosstalk XT [dB/100 km] and the bending radius [mm] in the case in which the wavelength of the light beam propagating through the core is set to 1,565 nm, where the correlation length is 50 mm under condition 2 shown in Table 1.

Under condition 2 shown in Table 1, the one-kilometer cutoff wavelength [μm], where the thickness of the low refractive index layer surrounding the cores is changed, is shown in FIG. 11, the relationship between the bending loss [dB/km] of the $LP_{01}$ mode light beam and the distance OCT [μm], where the bending radius R is 140 mm (the bending diameter is 280 mm), is shown in FIG. 12, and the relationship between the inter-core crosstalk XT [dB/100 km] and the bending radius [mm] in the case in which the correlation length is 50 mm and the wavelength of the light beam propagating through the core is set to 1,565 nm is shown in FIG. 13.

As described below, it is revealed that under condition 1 shown in Table 1, even though the ratio $W_1/r_{11}$ between the thickness $W_1$ of the low refractive index layer 13 and the radius $r_{11}$ of the first core 11 is set to 0.4 or more, a necessary distance OCT is not changed. The necessary distance OCT is revealed from FIG. 9. That is, in FIG. 9, the necessary distance OCT is determined at the positions at which lines drawn for the conditions of the thickness of the low refractive index layer ($W_1/r_{11}$ or $W_2/r_{21}$) cross a line (a broken line in FIG. 9) on which the propagation loss of the $LP_{01}$ mode light beam is 0.001 dB/km. Here, the case is considered in which $W_1/r_{11}$ is more increased, $W_2/r_{21}$ is decreased as apparent from FIG. 8. That is, the thickness $W_2$ of the low refractive index layer 23 is decreased. Subsequently, in FIG. 9, when $W_1/r_{11}$ is increased, the necessary distance OCT is decreased in the case in which attention is focused on the first core 11. However, since $W_2$ is decreased, the necessary distance OCT is increased in the case in which attention is focused on the second core 21. Therefore, it is revealed that the distance OCT that is the minimum is present in the case in which both the first and the second cores 11 and 21 are based. FIG. 10 reveals crosstalk at the bending radius at which the inter-core crosstalk XT is largest and at the bending radius (100 mm or more) in the case in which the typical use state of the multicore fiber 1 is assumed.

Similarly to condition 1, also under condition 2, from the viewpoint of providing the bending loss of the $LP_{01}$ mode light beam that is 0.001 dB/km and decreasing the distance OCT, FIGS. 11 to 13 reveal advantageous values of $W_1/r_{11}$ and $W_2/r_{21}$, the values of the distance OCT and the fiber diameters at the advantageous values, and crosstalk at the bending radius at which the inter-core crosstalk XT is largest and at the bending radius (100 mm or more) in the case in which the typical use state of the multicore fiber 1 is assumed.

The calculated result obtained based on the conditions shown in Table 1 under the consideration as described above is shown in Table 2 below. XT (d=50 mm) shown in Table 2 is the inter-core crosstalk XT [dB/100 km] at a bending radius of 155 mm in the case in which the wavelength of the light beam propagating through the core is 1,565 nm, where the correlation length d is 50 mm. $R_{pk}$ is the bending radius at which the inter-core crosstalk XT is largest.

TABLE 2

|  | $W_1/r_{11}$ | $W_2/r_{21}$ | OCT [μm] | Fiber diameter [μm] | XT (d = 50 mm) [dB/100 km] | $R_{pk}$ [mm] |
|---|---|---|---|---|---|---|
| Condition 1 | 0.3 | 1.1 | 37.3 | 234.37 | −19 | 55 |
| Condition 2 | 0.4 | 1.0 | 36.7 | 233.17 | −18 | 67 |
| Condition 3 | 0.2 | 0.9 | 37.2 | 234.17 | −15 | 55 |

In comparison of condition 2 with condition 3, the inter-core crosstalk XT is large under condition 3. This is because under condition 3, the relative refractive index difference $\Delta_{11}$ of the first core 11 to the outer cladding 30 is large and the thickness $W_1$ of the low refractive index layer 13 necessary to decrease the cutoff wavelength to a predetermined value or less is small. In comparison of condition 1 with condition 2, the distance OCT is thicker under condition 1 than under condition 2. This is because under condition 1, the relative refractive index difference $\Delta_{21}$ of the second core 21 to the outer cladding 30 is small and it is difficult to contain the light beam in the second core 21. When the difference of the propagation constant between the first and the second cores 11 and 21 is decreased by decreasing the relative refractive index difference $\Delta_{11}$ of the first core 11 to increase the relative refractive index difference $\Delta_{21}$ of the second core 21, for example, $R_{pk}$ is increased.

Comparative Example 1

Figure 14:
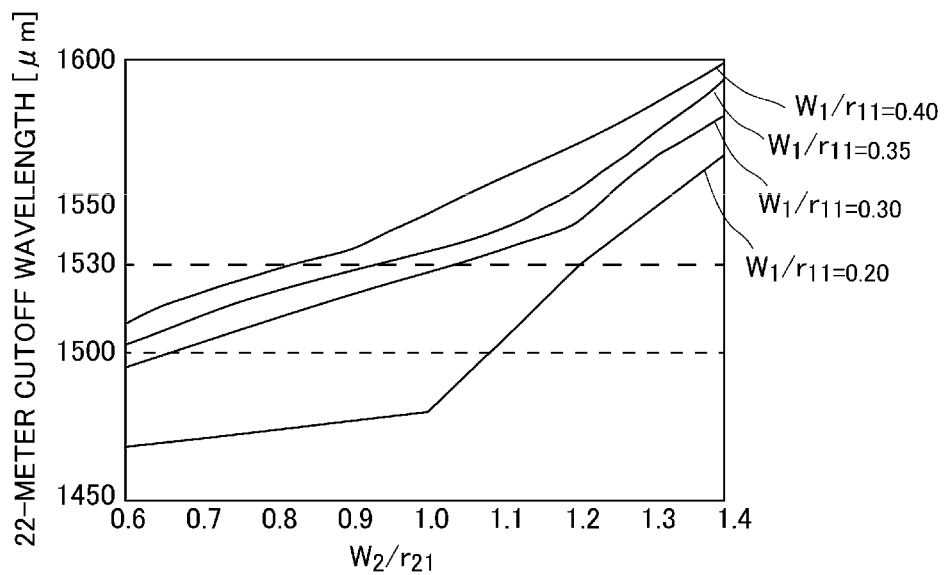
FIG. 14 is a diagram of the calculated result of a 22-meter cutoff wavelength [μm], where the thickness of the low refractive index layer surrounding the cores is changed, under condition 1 shown in Table 1.
Figure 15:
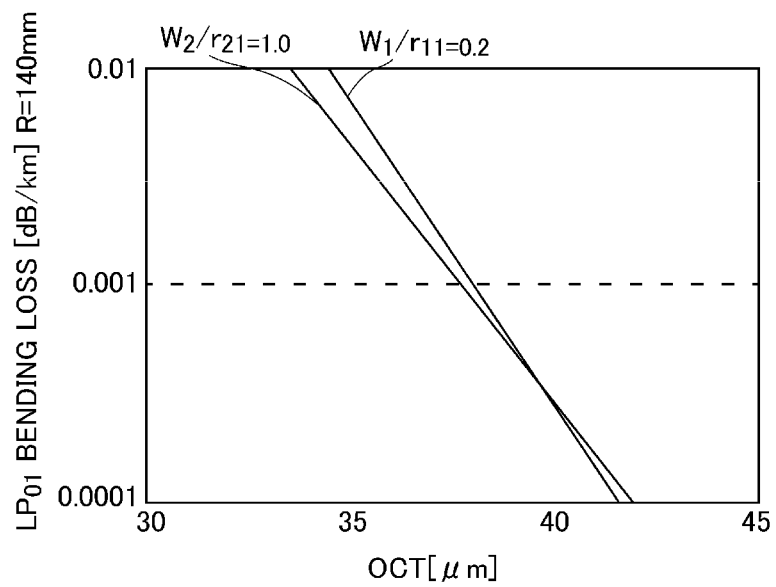
FIG. 15 is a diagram of the calculated result of the relationship between the bending loss [dB/km] of the $LP_{01}$ mode light beam and the distance OCT [μm] in the case in which the bending diameter is set to 280 mm, where the thickness of the low refractive index layer surrounding the cores is changed, under condition 1 shown in Table 1.
Figure 16:
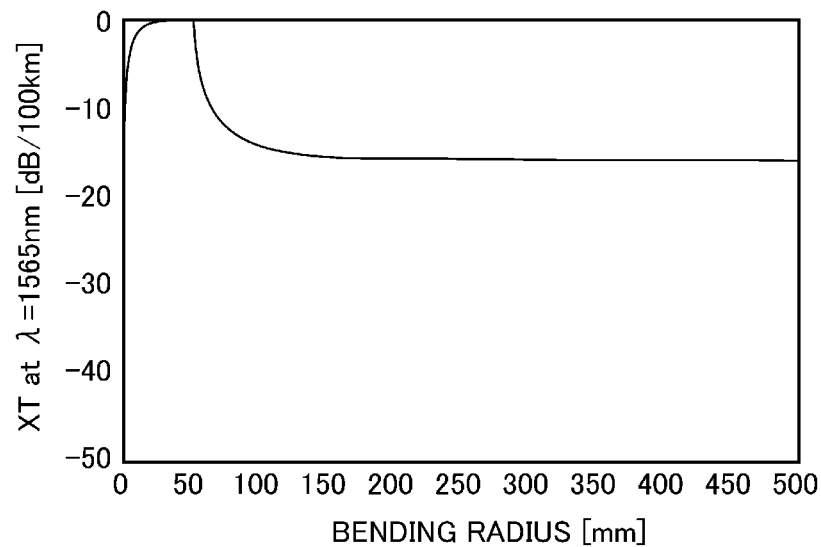
FIG. 16 is a diagram of the calculated result of the relationship between the inter-core crosstalk XT [dB/100 km] and the bending radius [mm] in the case in which the wavelength of the light beam propagating through the core is set to 1,565 nm, where the correlation length is 50 mm under condition 1 shown in Table 1.

With the use of the parameters of condition 1 shown in Table 1, the 22-meter cutoff wavelength [μm], where the thickness of the low refractive index layer surrounding the cores is changed, is shown in FIG. 14, the relationship between the bending loss [dB/km] of the $LP_{01}$ mode light beam and the distance OCT [μm], where the bending radius R is 140 mm (the bending diameter is 280 mm), is shown in FIG. 15, and the relationship between the inter-core crosstalk XT [dB/100 km] and the bending radius [mm] in the case in which the correlation length is 50 mm and the wavelength of the light beam propagating through the core is set to 1,565 nm is shown in FIG. 16. Similarly to example 1 except that the 22-meter cutoff wavelength is 1,500 nm or less, from the viewpoint of providing the bending loss of the $LP_{01}$ mode light beam that is 0.001 dB/km and decreasing the distance OCT, FIGS. 14 to 16 reveal advantageous values of $W_1/r_{11}$ and $W_2/r_{21}$, the values of the distance OCT and the fiber diameters at the advantageous values, and the values and the bending radius when the inter-core crosstalk XT is largest. The calculated result is shown in Table 3 below.

TABLE 3

|  | $W_1/r_{11}$ | $W_2/r_{21}$ | OCT [μm] | Fiber diameter [μm] | XT (d = 50 mm) [dB/100 km] |
|---|---|---|---|---|---|
| Condition 1 | 0.2 | 1.0 | 38.0 | 235.0 | −15.1 |
| Condition 2 | 0.3 | 1.0 | 39.5 | 238.8 | −16.0 |
| Condition 3 |  |  |  | 245 or more |  |

Comparison of Example 1 with Comparative Example 1

In the result shown in Table 2, the parameters are investigated in such a manner that the propagation loss of the $LP_{11}$ mode light beam at a wavelength of 1,500 nm is 0.02 dB/m or more and 1 dB/m or less in the core having the smallest propagation loss when a bend having a diameter of 280 mm is applied. That is, in the result shown in Table 2, the parameters are investigated in such a manner that the $LP_{11}$ mode light beam is sufficiently attenuated after the light beam propagates one kilometer. On the other hand, in the result shown in Table 3, the parameters are investigated in such a manner that the propagation loss of the $LP_{11}$ mode light beam at a wavelength of 1,500 nm is greater than 1 dB/m in all the cores when a bend having a diameter of 280 mm is applied. That is, in the result shown in Table 3, the parameters are investigated in such a manner that the $LP_{11}$ mode light beam is sufficiently attenuated after the light beam propagates 22 meters.

The comparison of example 1 (Table 2) with comparative example 1 (Table 3) confirmed that inter-core crosstalk can be more reduced with the fiber diameter decreased in defining the core pitch, the refractive index of the core, and any other parameters based on the cutoff wavelength after the light beam propagates one kilometer than on the basis of the cutoff wavelength after the light beam propagates 22 meters.

Example 2 and Comparative Example 2

Fiber A was prepared as a multicore fiber according to example 2, and fiber B was prepared as a multicore fiber according to comparative example 2. Fiber A is similar to the multicore fiber of example 1. Fiber B is similar to fiber A except that the propagation loss of the $LP_{11}$ mode light beam at a wavelength of 1,530 nm is greater than 1 dB/m in all the cores when a bend having a diameter of 280 mm is applied. The parameters of fiber A and fiber B are shown in Table 4 and Table 5 below. The optical measurement result of fiber A and fiber B is shown in Table 6. Note that, in Table 6 and Table 7 shown below, the core number corresponds to the core element number illustrated in FIG. 3.

TABLE 4

|  |  | Fiber A | Fiber B |
|---|---|---|---|
| First core | $\Delta_{11}$ [%] | 0.35 | 0.35 |
|  | $r_{11}$ [μm] | 4.80 | 4.80 |
|  | $W_1/r_{11}$ | 0.58 | 0.45 |
| Second core | $\Delta_{21}$ [%] | 0.31 | 0.31 |
|  | $r_{21}$ [μm] | 4.65 | 4.65 |
|  | $W_2/r_{21}$ | 1.03 | 1.00 |

TABLE 5

|  | Fiber A | Fiber B |
|---|---|---|
| Average core pitch [μm] | 28.8 | 29.0 |
| OCT [μm] | 37.2 | 37.6 |
| Fiber diameter [μm] | 242.5 | 243.8 |

TABLE 6

| | Fiber A | | | Fiber B | | |
|---|---|---|---|---|---|---|
| Core number | 22 m cutoff [nm] | 1 km cutoff [nm] | Aeff at 1550 nm [μm²] | 22 m cutoff [nm] | 1 km cutoff [nm] | Aeff at 1550 nm [μm²] |
| 1 | 1433 | 1374 | 83.0 | 1335 | 1302 | 80.9 |
| 2 | 1398 | 1273 | 80.3 | | | |
| 3 | 1401 | 1372 | | | | |
| 4 | 1373 | 1209 | | 1307 | 1214 | 80.6 |
| 5 | 1635 | 1493 | 81.5 | 1375 | 1352 | 81.5 |
| 6 | 1355 | 1248 | 82.5 | | | |
| 7 | 1423 | 1376 | | | | |
| 8 | 1380 | 1184 | | | | |
| 9 | 1520 | 1395 | 82.3 | | | |
| 10 | 1639 | 1264 | 80.9 | 1406 | 1344 | 80.6 |
| 11 | 1462 | 1402 | | 1372 | 1307 | 82.3 |
| 12 | 1399 | 1251 | | | | |
| 13 | 1410 | 1375 | | | | |
| 14 | 1352 | 1193 | 83.9 | 1317 | 1219 | 80.5 |
| 15 | 1634 | 1376 | | 1352 | 1306 | 80.1 |
| 16 | 1372 | 1230 | | | | |
| 17 | 1409 | 1380 | | | | |
| 18 | 1374 | 1223 | | | | |
| 19 | 1401 | 1380 | 82.6 | | | |
| 20 | 1635 | 1507 | 81.9 | 1404 | 1245 | 79.6 |
| 21 | 1626 | 1518 | | | | |
| 22 | 1627 | 1522 | | | | |
| 23 | 1625 | 1520 | 81.1 | 1402 | 1367 | 80.6 |
| 24 | 1630 | 1518 | | 1384 | 1343 | 80.7 |
| 25 | 1620 | 1522 | 81.4 | 1404 | 1368 | 81.4 |
| 26 | 1621 | 1516 | | | | |
| 27 | 1619 | 1526 | | | | |
| 28 | 1619 | 1527 | | | | |
| 29 | 1622 | 1516 | | 1412 | 1371 | 81.5 |
| 30 | 1647 | 1528 | 82.2 | 1408 | 1321 | 78.9 |
| 31 | 1617 | 1516 | 81.2 | 1433 | 1359 | 79.8 |
| 32 | 1622 | 1512 | 80.5 | 1432 | 1368 | 78.8 |

As apparent from Table 6, in fiber A, the 22-meter cutoff wavelength exceeded 1,600 nm in a part of the cores placed on the inner side, but the one-kilometer cutoff wavelength was below 1,530 nm in all the cores. On the other hand, in fiber B, similarly to the previously existing multicore fiber, the 22-meter cutoff wavelength was below 1,530 nm in all the cores.

Table 7 below shows the measurement result of the worst crosstalk [dB] when cores No. 6, 11, 22, and 29 were excited on fiber A and fiber B. The result shows the values that are converted into values after a light beam propagated through the cores 100 kilometers. Here, the worst crosstalk is crosstalk assuming that signals are transmitted through all the cores. Here, the worst crosstalk is the total of the crosstalk between two cores nearest to each other and the crosstalk between the second nearest cores placed on the diagonal line of the square lattice. Therefore, the number of combinations of crosstalk in the case in which the worst crosstalk is considered is varied depending on the positions of cores to be excited. The result shown in Table 7 is the result of measuring the worst crosstalk, where the winding diameter of the fiber is 310 mm, in the case in which the wavelength of the light beam propagating through the core is 1,550 nm, and in the case in which the wavelength of the light beam propagating through the core is 1,565 nm, which is considered that crosstalk is largest in the C band.

TABLE 7

| | Fiber A | | Fiber B | |
|---|---|---|---|---|
| Core number | 1550 nm | 1565 nm | 1550 nm | 1565 nm |
| 6 | −43.1 | −41.5 | −33.3 | −32.2 |
| 11 | −40.3 | −38.5 | −28.1 | −26.6 |
| 22 | −39.5 | −37.8 | −31.7 | −30.9 |
| 29 | −36.5 | −34.5 | −31.7 | −30.9 |

In comparison of fiber A with fiber B, in fiber A, crosstalk was small in all the cores. The reason can be considered that in fiber A, the core pitch, the refractive index of the core, and any other parameters were designed based on the one-kilometer cutoff wavelength.

Note that, $R_{pk}$ of fiber A is 100 mm or less, which was specifically about 60 mm. Since the bending radius of the optical fiber in a cable used for long-haul communications is a few hundreds mm, it can be considered that an excess increase in crosstalk does not easily occur due to bending in the case in which fiber A is used for long-haul communications. Fiber A had crosstalk smaller than −29 dB/100 km that is the conditions of crosstalk necessary to transmit a quadriphase shift keying (QPSK) signal 1,000 km.

The $LP_{11}$ mode light beam at a wavelength of 1,530 nm generated by a mode converter was inputted to core No. 23 in fiber A. As a result, since the cutoff wavelength is 1,600 nm or more at the position 22 meters from the input end, the $LP_{11}$ mode light beam was observed. However, since the cutoff wavelength is 1,530 nm or less at the position one kilometer from the input end, the $LP_{11}$ mode light beam is sufficiently attenuated, and the $LP_{01}$ mode light beam was observed, which was generated due to crosstalk in the mode converter. As described above, it was confirmed that in fiber A, after the light beam propagates through the core one kilometer, the needless higher-mode light beam is sufficiently attenuated to achieve single-mode communications.

Example 3

Figure 17:
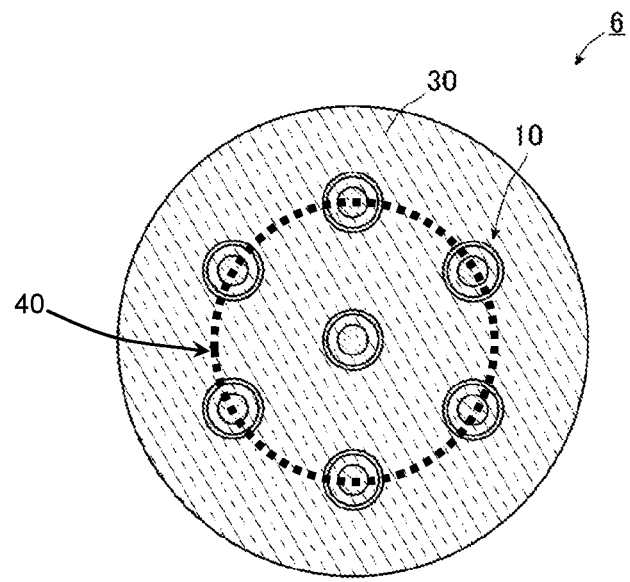
FIG. 17 is a diagram of a cross section perpendicular to the longitudinal direction of a multicore fiber according to example 3, similarly to FIG. 1.

FIG. 17 is a diagram of a cross section perpendicular to the longitudinal direction of the multicore fiber according to example 3, similarly to FIG. 1. In example 3, as illustrated in FIG. 17, a multicore fiber 6 was prepared in which the first core element 10 was placed in the center of the outer cladding 30 and on the apexes of a regular hexagon whose center was the center of the outer cladding 30. In the multicore fiber 6, six cores are placed on a reference circle 40 whose center is the core placed in the center of the outer cladding 30. As described above, the cutoff wavelength is more prone to be increased in the core surrounded by other core elements than in other cores. Therefore, in the multicore fiber 6, the cutoff wavelength is easily increased in the core placed in the center of the outer cladding 30. In the present example, the multicore fiber 6 was designed so that information can be transmitted using the $LP_{01}$ mode and the $LP_{11}$ mode light beams. The parameters of the multicore fiber 6 are shown in Table 8 below. $\Delta_{11}$, $r_{11}$, $r_{12}$, and $W_{11}$ in Table 8 are as defined using FIG. 2B. $A_{\it{eff}}$ ($LP_{01}$) is the effective area in the case in which the wavelength of the $LP_{01}$ mode light beam propagating through the core is 1,550 nm. $A_{\it{eff}}$ ($LP_{11}$) is the effective area in the case in which the wavelength of the $LP_{11}$ mode light beam propagating through the core is 1,550 nm.

TABLE 8

| $\Delta_{11}$ [%] | $r_{11}$ [μm] | $r_{12}/r_{11}$ | $W_1/r_{11}$ | $A_{eff}(LP_{01})$ [μm²] | $A_{eff}(LP_{11})$ [μm²] |
|---|---|---|---|---|---|
| 0.42 | 6.4 | 1.8 | 0.8 | 110 | 175 |

Figure 18:
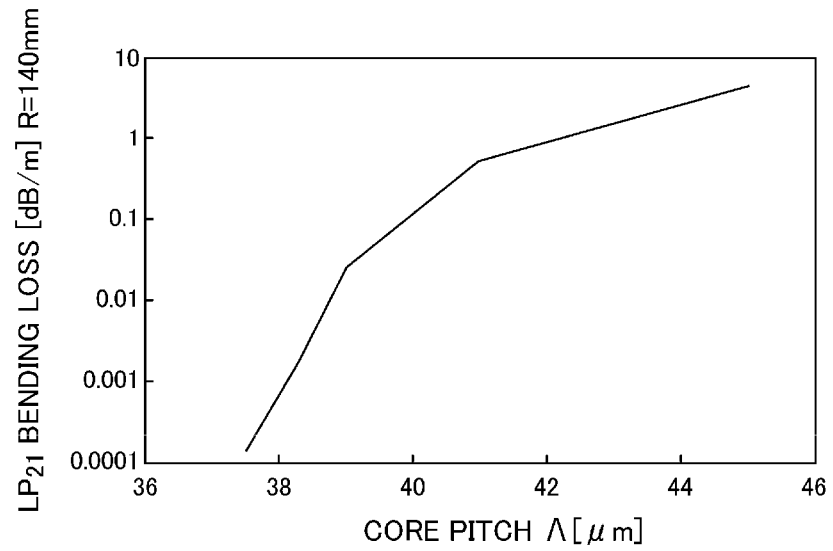
FIG. 18 is a diagram of the relationship between the bending loss [dB/km] of an $LP_{21}$ mode light beam and a center pitch A between cores adjacent to each other.

FIG. 18 illustrates the relationship between the bending loss [dB/km] of the $LP_{21}$ mode light beam and the center pitch Λ between the cores adjacent to each other when the bending radius R is set to 140 mm (the bending diameter is set to 280 mm). In the present example, since the $LP_{01}$ mode and the $LP_{11}$ mode light beams are used for transmitting information as described above, the propagation of the $LP_{21}$ mode light beam that is a light beam in higher mode than the $LP_{11}$ mode light beam has to be reduced. FIG. 18 reveals that in order to set the 22-meter cable cutoff wavelength to 1,530 nm or less, i.e. in order to set the propagation loss of the $LP_{21}$ mode light beam to 1 dB/m or more, the core pitch Λ has to be set to 42.5 μm or more. On the other hand, it is revealed that in order to set the one-kilometer cutoff wavelength to 1,530 nm or less, i.e. in order to set the propagation loss of the $LP_{21}$ mode light beam to 0.02 dB/m or more, the core pitch Λ may be decreased to about 38.8 μm.

Figure 19:
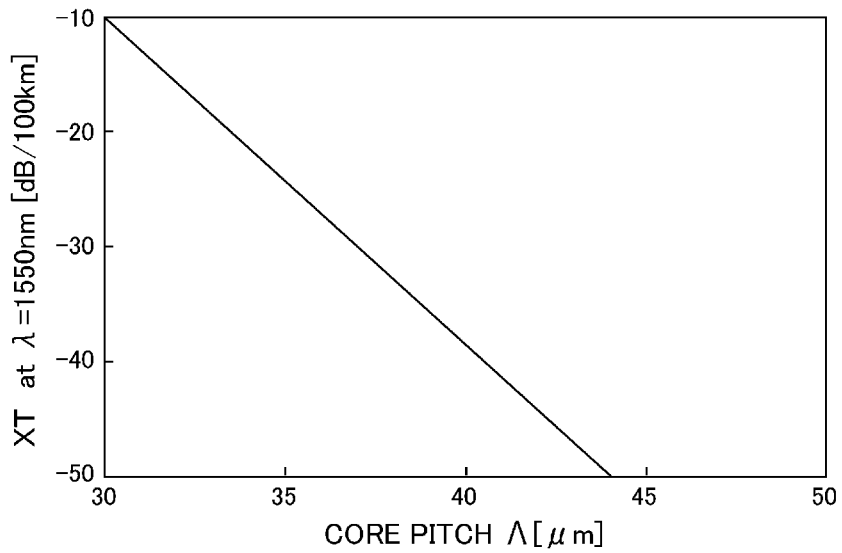
FIG. 19 is a diagram of the relationship between the magnitude of inter-core crosstalk in the $LP_{11}$ mode light beam and the center pitch Λ between the cores adjacent to each other at a wavelength of 1,550 nm.

FIG. 19 illustrates the relationship between the magnitude of inter-core crosstalk in the $LP_{11}$ mode light beam and the center pitch Λ between the cores adjacent to each other at a wavelength of 1,550 nm. FIG. 19 reveals that even though the core pitch Λ is decreased to 38.8 μm, crosstalk after 100 kilometer propagation is −30 dB or less, and QPSK signals are transmittable.

Comparative Example 3

Similarly to example 3, a multicore fiber according to comparative example 3 was prepared using a preform similar to a preform used for preparing the multicore fiber according to example 3, except that the preform was drawn so as to provide a core pitch of 45 μm. In the multicore fiber according to comparative example 3, since the core pitch Λ is 42.5 μm or more, it can be considered that the 22-meter cable cutoff wavelength is 1,530 nm or less in all the cores as described above. The measurement result of the core pitch Λ, the distance OCT, and the fiber diameter of the multicore fiber according to example 3 and the multicore fiber according to comparative example 3 is shown in Table 9 below. The optical measurement result of the multicore fiber 6 according to example 3 and the multicore fiber according to comparative example 3 is shown in Table 10 below. Note that, the cutoff wavelength shown in Table 10 is the result of measuring the core placed in the center of the outer cladding 30.

TABLE 9

|  | Core pitch Λ [μm] | OCT [μm] | Fiber diameter [μm] |
|---|---|---|---|
| Example 3 | 39.0 | 51.6 | 181.0 |
| Comparative example 3 | 46.2 | 51.6 | 195.4 |

TABLE 10

|  |  | Example 3 | Comparative example 3 |
|---|---|---|---|
| MFD [μm] | 1550 nm | 11.5 | 11.5 |
|  | 1625 nm | 11.8 | 11.8 |

TABLE 10-continued

|  |  | Example 3 | Comparative example 3 |
|---|---|---|---|
| $A_{eff}$ [μm] | 1550 nm | 112.7 | 112.7 |
|  | 1625 nm | 117.7 | 117.7 |
| Propagation loss [dB/km] | 1550 nm | 0.229 | 0.229 |
|  | 1625 nm | 0.239 | 0.239 |
| DMD [ps/km] | 1550 nm | $2.7 \times 10^3$ | $2.7 \times 10^3$ |
| Wavelength dispersion [ps/nm/km] | 1550 nm | 21.3 | 21.3 |
| 22-meter cutoff wavelength (center core) [nm] |  | 1620 | 1420 |
| One-kilometer cutoff wavelength (center core) [nm] |  | 1528 | 1370 |

Since similar preforms are used in the multicore fiber according to example 3 and the multicore fiber according to comparative example 3, the optical properties other than the cutoff wavelength were the same as shown in Table 10. As shown in Table 9, a decrease in the fiber diameter was enabled in the multicore fiber according to example 3 more than in the multicore fiber according to comparative example 3. The effect that can decrease the fiber diameter as described above is more noticeable as the number of cores provided in the multicore fiber is more increased.

The multicore fiber according to one or more embodiments described above is suitable for long-haul communications, and is usable in optical communication industries.

Although the disclosure has been described with respect to only a limited number of embodiments, those skilled in the art, having benefit of this disclosure, will appreciate that various other embodiments may be devised without departing from the scope of the present invention. Accordingly, the scope of the invention should be limited only by the attached claims.

REFERENCE SIGNS LIST 1, 2, 3, 4, 5, 6 . . . multicore fiber
10 . . . first core element
11 . . . first core
12 . . . inner cladding
13 . . . low refractive index layer
15 . . . core
20 . . . second core element
21 . . . second core
22 . . . inner cladding
23 . . . low refractive index layer
30 . . . outer cladding
40 . . . reference circle

The invention claimed is:

1. A multicore fiber comprising:
a first core having a first propagation loss of a first light beam in a mode one order higher than a mode of a second light beam that transmits information, wherein the first propagation loss is 0.02 dB/m or more and less than 1 dB/m, in a wavelength band of light beams, including the second light beam, that transmit the information when a bend having a diameter of 280 mm is applied to the multicore fiber.

2. The multicore fiber according to claim 1, further comprising:
an inner cladding that surrounds an outer circumferential surface of the first core; and
a low refractive index layer with a refractive index lower than a refractive index of the inner cladding, wherein the low refractive index layer surrounds the inner cladding.

3. The multicore fiber according to claim 1, wherein the second light beam is an $LP_{01}$ mode light beam.

4. The multicore fiber according to claim 1, wherein the second light beam is an $LP_{01}$ mode light beam and an $LP_{11}$ mode light beam.

5. The multicore fiber according to claim 1, further comprising:
exactly 32 cores formed of two types of cores having different propagation constants that are disposed in a square lattice in an alternating arrangement, wherein the first core is one of the 32 cores,
a bending radius of the multicore fiber is 100 mm or more and inter-core crosstalk is −29 dB/100 km or less, and
a cladding diameter is 250 μm or less.

6. The multicore fiber according to claim 1, further comprising a plurality of cores that include:
the first core;
a second core disposed at a center of a reference circle; and
a third core disposed closest to the second core among the plurality of cores, wherein
the reference circle has a radius that connects a center of the second core to a center of the third core, and
the second core having a second propagation loss of the first light beam that is 0.02 dB/m or more and 1 dB/m or less in the wavelength band when the reference circle overlaps at least three cores and when the bend having the diameter of 280 mm is applied to the multicore fiber.

7. The multicore fiber according to claim 6, wherein the second propagation loss is 0.02 dB/m or more and 1 dB/m or less in the wavelength band when the reference circle overlaps six cores.

8. The multicore fiber according to claim 1, wherein the first propagation loss is 0.02 dB/m or more and 1 dB/m or less in all cores of the multicore fiber, except the first core, in the wavelength band when the bend having the diameter of 280 mm is applied to the multicore fiber.

9. A multicore fiber comprising:
a first core having a first propagation loss of a first light beam in a mode one order higher than a mode of a second light beam that transmits information, wherein
the first propagation loss is 0.02 dB/m or more and 1 dB/m or less, in a wavelength band of light beams, including the second light beam, that transmit the information when a bend having a diameter of 280 mm is applied to the multicore fiber, and
the second light beam is an $LP_{01}$ mode light beam.

10. The multicore fiber according to claim 9, further comprising:
an inner cladding that surrounds an outer circumferential surface of the first core; and
a low refractive index layer with a refractive index lower than a refractive index of the inner cladding, wherein
the low refractive index layer surrounds the inner cladding.

11. The multicore fiber according to claim 9, further comprising:
exactly 32 cores formed of two types of cores having different propagation constants that are disposed in a square lattice in an alternating arrangement, wherein
the first core is one of the 32 cores,
a bending radius of the multicore fiber is 100 mm or more and inter-core crosstalk is −29 dB/100 km or less, and
a cladding diameter is 250 μm or less.

12. The multicore fiber according to claim 9, further comprising a plurality of cores that include:
the first core;
a second core disposed at a center of a reference circle; and
a third core disposed closest to the second core among the plurality of cores, wherein
the reference circle has a radius that connects a center of the second core to a center of the third core, and
the second core having a second propagation loss of the first light beam that is 0.02 dB/m or more and 1 dB/m or less in the wavelength band when the reference circle overlaps at least three cores and when the bend having the diameter of 280 mm is applied to the multicore fiber.

13. The multicore fiber according to claim 12, wherein the second propagation loss is 0.02 dB/m or more and 1 dB/m or less in the wavelength band when the reference circle overlaps six cores.

14. The multicore fiber according to claim 9, wherein the first propagation loss is 0.02 dB/m or more and 1 dB/m or less in all cores of the multicore fiber, except the first core, in the wavelength band when the bend having the diameter of 280 mm is applied to the multicore fiber.

15. A multicore fiber comprising:
exactly 32 cores formed of two types of cores having different propagation constants that are disposed in a square lattice in an alternating arrangement; and
a first core has a first propagation loss of a first light beam in a mode one order higher than a mode of a second light beam that transmits information, wherein
the first propagation loss is 0.02 dB/m or more and 1 dB/m or less, in a wavelength band of light beams, including the second light beam, that transmit the information when a bend having a diameter of 280 mm is applied to the multicore fiber,
the first core is one of the 32 cores,
a bending radius of the multicore fiber is 100 mm or more and inter-core crosstalk is −29 dB/100 km or less, and
a cladding diameter is 250 μm or less.

16. The multicore fiber according to claim 15, further comprising:
an inner cladding that surrounds an outer circumferential surface of the first core; and
a low refractive index layer with a refractive index lower than a refractive index of the inner cladding, wherein
the low refractive index layer surrounds the inner cladding.

17. The multicore fiber according to claim 15, wherein the second light beam is an $LP_{01}$ mode light beam.

18. The multicore fiber according to claim 15, wherein the second light beam is an $LP_{01}$ mode light beam and an $LP_{11}$ mode light beam.

19. The multicore fiber according to claim 15, further comprising:
a second core, among the 32 cores, disposed at a center of a reference circle; and
a third core, among the 32 cores, disposed closest to the second core, wherein
the reference circle has a radius that connects a center of the second core to a center of the third core, and
the second core having a second propagation loss of the first light beam that is 0.02 dB/m or more and 1 dB/m or less in the wavelength band when the reference circle overlaps at least three cores and when the bend having the diameter of 280 mm is applied to the multicore fiber.

20. The multicore fiber according to claim 15, wherein the first propagation loss is 0.02 dB/m or more and 1 dB/m or less in all cores of the multicore fiber, except the first core, in the wavelength band when the bend having the diameter of 280 mm is applied to the multicore fiber.

\* \* \* \* \*